United States Patent [19]

Parkinson

[11] 3,766,379
[45] Oct. 16, 1973

[54] MEASURING DENSITY BY BETA-PARTICLE ABSORPTION

[75] Inventor: Michael John Parkinson, Effingham Junction, England

[73] Assignee: The British Coal Utilisation Research Association Limited, Leatherhead, Surrey, England

[22] Filed: Mar. 4, 1971

[21] Appl. No.: 120,866

Related U.S. Application Data

[63] Continuation-in-part of Ser. No. 829,242, June 2, 1969.

[30] Foreign Application Priority Data

June 5, 1968  Great Britain .................. 26,822/68

[52] U.S. Cl. ........ 250/43.5 D, 250/71.5 R, 250/105
[51] Int. Cl. .......................................... G01n 23/12
[58] Field of Search .................. 250/43.5 D, 43.5 R, 250/43.5 F, 43.5 L, 105, 53.3 D, 71.5 R, 83.6 R, 52

[56] References Cited
UNITED STATES PATENTS 3,248,541  4/1966  Crump ........................ 250/43.5 D
3,087,061  4/1963  Dukes et al. ................. 250/833 D

FOREIGN PATENTS OR APPLICATIONS 931,825  7/1963  Great Britain ................ 250/43.5 D Primary Examiner—Archie R. Borchelt
Assistant Examiner—Davis L. Willis
Attorney—Hall & Houghton

[57] ABSTRACT

In measuring density of a gaseous suspension of solid particles two or more sources of β-particles, a collimator and a single β-particle detector are used to obtain a single reading which is a measure of the average density of the gaseous suspension.

9 Claims, 1 Drawing Figure

PATENTED OCT 16 1973
3,766,379
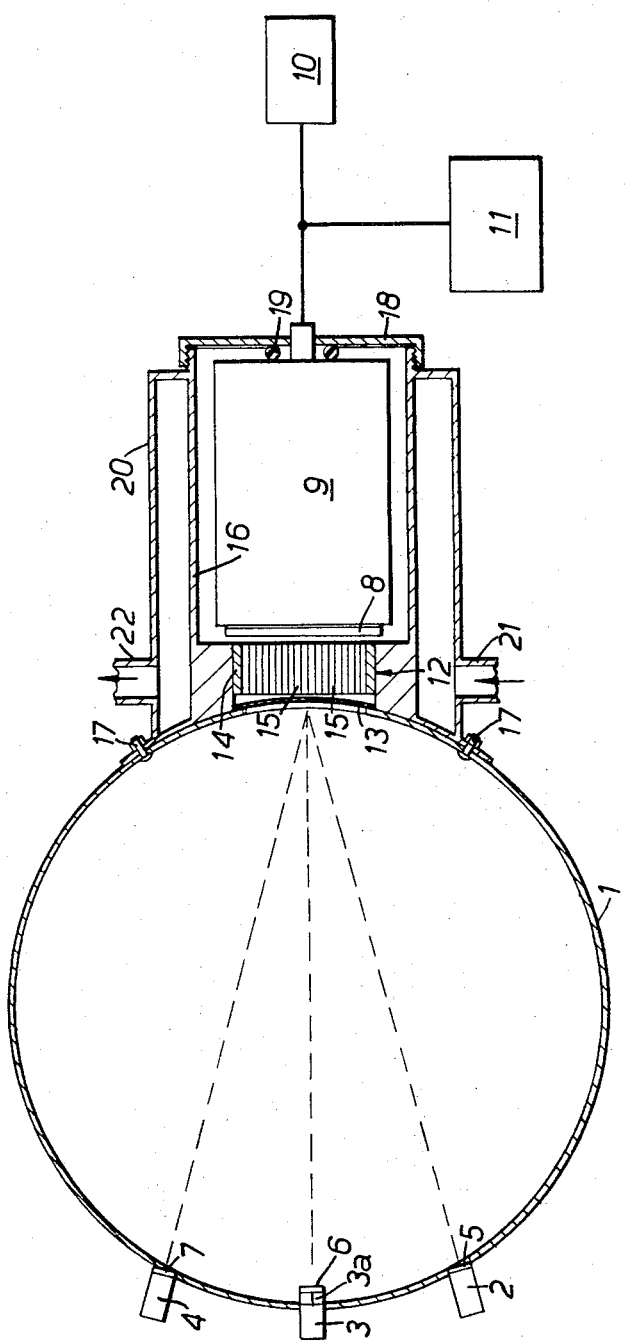
MICHAEL J. PARKINSON,
INVENTOR
BY Hall + Haylor
ATTORNEY

MEASURING DENSITY BY BETA-PARTICLE ABSORPTION

The invention relates to measuring density by β-particle absorption of a gaseous suspension of solid particles flowing along a conduit and is a Continuation-in-Part of my earlier U.S. Pat. application Ser. No. 829,242.

It is well known that the density of a material can be calculated from a measurement of its absorption of β-particles. This measurement can be carried out by placing the material between a radio-active source emitting β-particles and a β-particle detector and determining the count rate of β-particles leaving the material. When the material in question is a gaseous suspension of solid particles flowing along a conduit, the density of the suspension will commonly not be uniform over the entire cross-sectional area of the conduit and such a single measurement of the β-particle absorption will often be misrepresentative of the true average density of the material. An arrangement employing several sets of sources and detectors to take several density measurements along different absorpiton paths simultaneously is, however, relatively costly because of the amount of expensive equipment required.

The invention provides density-measuring apparatus for measuring the density of a gaseous suspension of solid particles flowing along a conduit, which apparatus comprises two or more sources of β-particles, a β-particle detector and a collimator, which comprises a plurality of straight tubes arranged wih their axes extending parallel to each other and which is arranged adjacent to the detector between the detector and the gaseous suspension so that β-particles from any of the sources that have passed through the collimator after leaving the gaseous supension will be detected, the sources being located at equal distances from the detector and being of such strengths that the count rates of β-particles detected from each of the sources are equal to one another when the gaseous suspension is not flowing along the conduit.

With the arrangement of the invention it is possible to obtain a single reading giving a measure of the average density of the gaseous suspension using only one detector.

The invention also provides a method of measuring density by β-particle absorption of a gaseous suspension of solid particles flowing along a conduit, which comprises causing β-particles from two or more sources to be incident upon the suspension, detecting by means of a detector β-particles from any of the sources that have passed through a collimator after leaving the suspension, the sources being located at equal distances from the detector, establishing the same count rate of β-particles detected from each of the sources when the gaseous suspension is not flowing along the conduit, and obtaining a reading dependent on the total number of β-particles detected.

The number of β-particle sources that should be used to give a reasonably representative mean value for the average density of the gaseous suspension will depend on the spatial variation in density of the suspension, and on the position of the sources. The more sources that are employed, the more representative the result is likely to be. It has been found, however, that three sources can give a satisfactory result under most conditions if they are suitably positioned with respect to the suspension and to the detector. When the conduit is of circular cross-section, one of these sources may be positioned diametrically opposite the collimator and the other two sources positioned on either side of that source so that the angles between the lines joining the said other two sources to the collimator and the line joining the first-mentioned source to the collimator are equal, the collimator being so orientated that the first-mentioned source lies on the axis of the collimator.

It will generally be found that all the sources should be arranged at positions sufficiently far downstream of any bend in the conduit that any centrifugal effect on the particle distribution in the suspension across the conduit has been reduced to an acceptable degree. The distance from a bend at which the sources should be positioned in any particular case will depend on the configuration of the conduit but it will generally be found that a distance equal to at least five times the diameter of the conduit will be required.

In an arrangement in which the collimator consists of tubes of a sufficiently small diameter that good collimation of the β-particles is obtained there will be a substantially linear relationship between a change in the average mass per unit area perpendicular to the path of β-particles from each of the sources to the detector of the gaseous suspension between each of the sources and the collimator and a corresponding change in the log of the count rate of β-particles reaching the detector. Moreover, the count rate using any one of the sources alone will give a measure of the average density of the gaseous suspension along the path of β-particles from that source to the detector and will be substantially independent of possible variations in the density distribution along that path.

The optimum values for the diameter and length of the collimator tubes depends upon the positioning of the sources relative to the detector. Thus, a decrease in the maximum angle between the paths of β-particles from different sources to the detector permits the use of collimator tubes of smaller diameter and/or greater length without reducing the count rate of β-particles. Increasing the maximum angle will necessitate a decrease in the collimation, that is to say, an increase in the diameter of the collimator tubes an/or a decrease in the length of the collimator tubes, for the same count rate, with the result that the count rate from any particular source will tend to vary more with variations in the density distribution along that path.

In practice, it will usually be found that a satisfactory compromise between the requirements for good collimation and the desirability of having an optimum angular separation between the paths can readily be achieved. Thus, for example, it has been found that when using three β-particles sources, one of the sources being positioned diametrically opposite to, and on the axis of, the collimator and the other two sources being positioned on either side of that source so that the angle between the lines joining the said other two sources to the collimator and the line joining the first-mentioned source to the collimator is 17° in each case, a satisfactory result can be obtained if a collimator having an aperture of 5.0 cm. in diameter and comprising tubes of 0.4 cm. internal diameter and 1.25 cm. in length is used.

Advantageously, the sources and the axis of the detector are in the same plane.

When a conduit which is circular in cross-section is employed together with three sources, one being arranged diametrically opposite to, and on the axis of, the collimator and the other two being arranged on either side at equal angular distances from the axis of the collimator, and if, as is advantageous, the sources and the axis of the detector are in the same plane, then in order to obtain equal distances between each source and the detector, the said other two sources may be positioned in the wall of the conduit and the first-mentioned source may be positioned within the conduit. The first-mentioned source may be mounted on a suitable probe so that the distance of the source from the detector can be easily adjusted and the source is advantageously contained within a casing of suitably stream-lined shape so as to reduce abrasion of the casing by the particles in suspension. Disruption in the flow of the gaseous suspension can also be reduced. In order to avoid having one of the sources inside the conduit, equality of path lengths can be obtained either by locating the other two sources in pockets in the conduit, in which case either the pockets should be purged or a suitable window provided to prevent particles from collecting in the pockets, or it can be obtained by offsetting the sources in an axial direction. With this latter arrangement, however, it may be found more difficult to obtain accurate positioning of the sources.

To obtain equal count rates from each of the sources when the gaseous suspension is not flowing along the conduit, it is preferable to adjust the thickness of the windows of the sources and/or the windows of the conduit if the sources are positioned in the wall of the conduit through which the $\beta$-particles pass to the detector.

The collimator tubes are preferably constructed from materials which contain substantially no quantity of any element having an atomic number greater than 16 in order to keep the $\gamma$-emission low. They may, for instance, be constructed of polythene or polyvinyl chloride.

The $\beta$-particle detector may be any of the well-known forms, for example, a Geiger-Müller Counter, or an ionization gauge, but it is preferably a photo-multiplier used in conjunction with a scintillator.

If the chemical composition of the gaseous suspension is constant, the method and apparatus of the invention can be used to measure the average density of a suspension containing elements of any atomic number. If, however, the chemical composition varies, it will generally be found that the suspension should not contain any substantial quantity of an element of atomic number greater than 16. This is because the introduction into the suspension of elements having atomic numbers greater than this will give rise to changes in the absorption coefficient that are disproportionate to the mass of such material introduced.

Density-measuring apparatus constructed in accordance with the invention will now be described by way of example with reference to the accompanying drawing, the single figure of which is a diagrammatic vertical section through the apparatus.

EXAMPLE

With reference to the drawing, the apparatus comprises a conduit 1 of circular cross-section and 870 mm. in diameter, through which, in use, a gaseous suspension of coal particles flows. Three radio-active sources 2, 3 and 4, respectively, each of which comprises strontium-90 in a stainless steel casing, are arranged around one side of the conduit 1 so that $\beta$-particles emitted through nylon windows 5, 6 and 7, respectively, in each of the sources pass across the conduit through the gaseous suspension. The sources 2 and 4 are each positioned outside the conduit 1, the windows 5 and 7, respectively, being located in apertures in the wall of the conduit, and the source 3 extends through a further aperture into the conduit. A wedge-shaped member 3a made of nylon is provided around the part of the source 3 apart from the window 6 inside the conduit 1. The narrow end of the wedge-shaped member 3a is arranged to point in the direction opposite to the direction of flow of the suspension of coal particles along the conduit so as to reduce abrasion of the casing by the particles in suspension.

Diametrically opposite the source 3 is arranged a detector which comprises a scintillator 8 and a photo-multiplier 9, and which is connected to a source of extra high tension i.e., voltage 10. A count rate meter 11 to measure the total number of $\beta$-particles detected per unit time is also connected to the detector. A collimator, indicated generally by the reference numeral 12, is located between the scintillator 8 and a nylon window 13 in the conduit 1. The collimator consists of a short cylindrical member 14 of 50 mm. internal diameter and of a number of polythene or polyvinyl chloride tubes 15 packed into the member 14 and arranged with their axes parallel to each other and to that of the member 14. The external surfaces of the tubes 15 are glued together to ensure that they remain secured within the member 14. The tubes have an internal diameter of 0.4 cm. and are 1.25 cm. in length.

The collimator 12, the scintillator 8 and the photo-multiplier 9 are held within a casing 16 secured to the conduit 1 by means of bolts 17, the end of the casing remote from the conduit being closed by a screw cap 18 formed with a central aperture through which the connections between the photo-multiplier 9 and the source of extra high tension 10 pass. A sealing ring 19 is provided to prevent light leaking into the casing 16 through the aperture. A water jacket, indicated generally by the reference numeral 20, is also provided around the casing 16, an inlet 21 and an outlet 22 permitting circulation of water through the jacket so as to cool the photo-multiplier 9 which otherwise might become overheated due to thermal emission from its photo-cathode.

The three sources 2, 3 and 4 are each arranged at equal distances from the collimator 12, the sources 2 and 4 being arranged so that the lines joining them to the collimator are each at an angle of 17° to the line joining the source 3 to the collimator.

In setting the apparatus up, the distances between the sources, 2, 3 and 4 at their selected positions and the detector are first made equal. For easy adjustment the source 3 can be mounted on a suitable probe. The count rate of $\beta$-particles detected from each of the sources separately is then measured, the other two sources being removed. The count rates are then adjusted so that each of the sources separately has a count rate equal to that of the source having the lowest count rate by inserting aluminium plates of different thicknesses between the source and its window. Fine adjustments can be made with aluminum foil. The gaseous suspension of coal particles is then allowed to flow along the conduit and the total count rate N of $\beta$-particles detected is measured. The average density $\rho$ of the gaseous suspension flowing along the conduit can then be calculated from the formula $$N/N_o = \exp(-\mu\rho D)$$

where $N_o$ is the total count rate of $\beta$-particles detected with the suspending gas only present, $\mu$ is the absorption coefficient and $D$ is the distance between each of the sources and the collimator, $\mu$ and $D$ being known.

I claim:

1. Density measuring apparatus for measuring the density of a gaseous suspension of solid particles flowing along a conduit, said apparatus comprising:
   a. a $\beta$-particle detector,
   b. a collimator having a plurality of straight tubes arranged with their axes parallel to the axis of the collimator,
   c. said collimator being positioned adjacent to and in axial alignment with said detector between said detector and the gaseous suspension so that $\beta$-particles that have passed through the collimator after leaving the gaseous suspension will be detected by said detector, and
   d. two or more sources of $\beta$-particles positioned to each direct $\beta$-particles through said gaseous suspension toward said detector, said sources of $\beta$-particles being equal distances from said collimator,
   e. the lengths and widths of the tubes of said collimator being proportioned to admit to said detector $\beta$-particles directed theretoward from each of said sources, and
   f. said sources being of such strengths that the count rates of $\beta$-particles detected by said detector from each of said sources are equal to one another when the gaseous suspension is not flowing through the conduit, whereby the ratio of (N) the total count rate of $\beta$-particles detected when the suspension is flowing in the conduit, to ($N_o$) the total count rate of $\beta$-particles detected with only the suspending gas present in the conduit, affords a measure of the average density of said gaseous suspension.

2. Density-measuring apparatus according to claim 1, wherein there are three sources of $\beta$-particles, one of the sources being positioned on the axis of the collimator, and the other two sources being positioned on either side of that source so that the angles between the lines joining the said other two sources to the collimator and the line joining the first-mentioned source to the collimator are equal.

3. Density-measuring apparatus according to claim 2, wherein the conduit is circular and the axis of the collimator lies on a diameter of the conduit.

4. Density-measuring apparatus according to claim 1, wherein the sources and the axis of the detector are in the same plane.

5. Density-measuring apparatus according to claim 4, wherein the conduit is circular and there are three sources of $\beta$-particles, one of sources positioned diametrically opposite the collimator and within the conduit and the other two sources being positioned on either side of that source in the wall of the conduit so that the angles between the lines joining the said other two sources to the collimator and the line joining the first-mentioned source to the collimator are equal, the collimator being so orientated that the first-mentioned source lies on the axis of the collimator.

6. Density-measuring apparatus according to claim 1, wherein the sources are arranged in the wall of the conduit and are offset axially.

7. Density-measuring apparatus according to claim 1, wherein the collimator tubes are constructed from materials which contain substantially no quantity of any element having an atomic number greater than 16.

8. Density-measuring apparatus according to claim 7, wherein the collimator tubes are constructed from polythene or polyvinyl chloride.

9. A method of measuring density by $\beta$-particle absorbtion of a gaseous suspension of solid particles flowing along a conduit with the aid of a $\beta$-particle detector, a collimator having a plurality of straight tubes arranged with their axes parallel to the axis of the collimator and positioned in axial alignment with said detector between said detector and the gaseous suspension, and a plurality of $\beta$-particle sources spaced equidistant from said detector, which method comprises:
   1. directing $\beta$-particles from said plurality of sources across said conduit toward said collimator at angles such that $\beta$-particles from each of said sources reach said detector through said collimator after passing through different regions of said conduit,
   2. adjusting the strengths of said sources so that the count rates of $\beta$-particles detected by said detector from each of said sources are equal to one another when the gaseous suspension is not flowing through the conduit, and
   3. measuring the total count rate of $\beta$-particles reaching said detector from said plurality of sources when said gaseous suspension is flowing in the conduit, and when only the suspending gas is present, thereby obtaining two data values the ratio of which is a measure of the average density of the gaseous suspension flowing in the conduit.

* * * * *